United States Patent [19]
Brewer

[11] 3,791,433
[45] Feb. 12, 1974

[54] FILAMENT-WOUND, TOROIDAL TIRE WITH PNEUMATIC RIM-LOCKING TUBE

[75] Inventor: Howell K. Brewer, Dayton, Ohio

[73] Assignee: The United States of America as represented by the Secretary of the Air Force, Washington, D.C.

[22] Filed: July 13, 1972

[21] Appl. No.: 271,467

[52] U.S. Cl............... 152/339, 152/350, 152/393, 152/415
[51] Int. Cl. .................... B60c 5/00, B60c 15/02
[58] Field of Search ... 152/330, 331, 320, 322, 325, 152/327, 329, 340, 349, 350, 393, 362, 356, 415

[56] References Cited
UNITED STATES PATENTS
1,041,739  10/1912  Chipley............................ 152/339
3,628,586  12/1971  Curtiss............................. 152/356

FOREIGN PATENTS OR APPLICATIONS
20,956  4/1897  Great Britain..................... 152/339

Primary Examiner—Drayton E. Hoffman

[57] ABSTRACT

A closed membrane, toroidal tire having a cord reinforced rubber tube positioned within the tire casing, and inflatable for automatically urging the inner casing portion in locking relation against the rim of an aircraft or other, vehicular wheel on which it is mounted.

7 Claims, 4 Drawing Figures

PATENTED FEB 12 1974 3,791,433
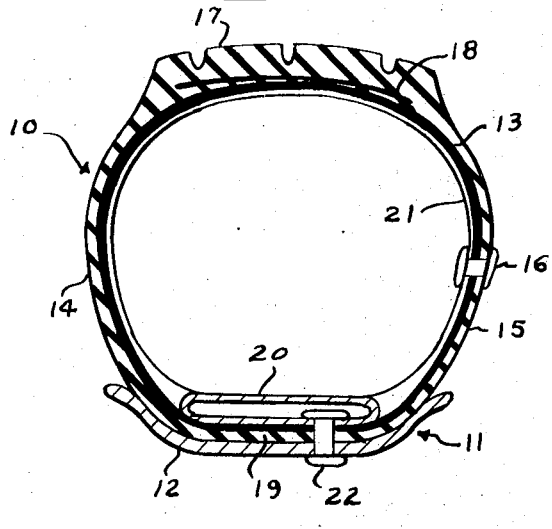
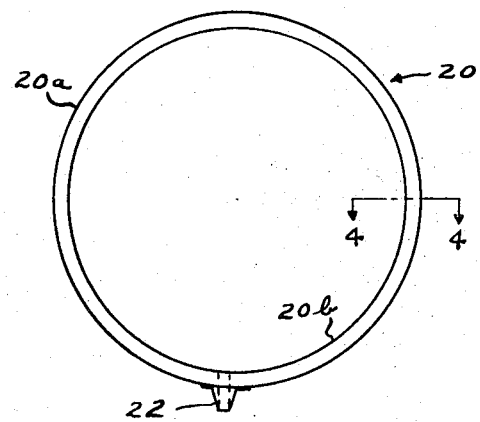
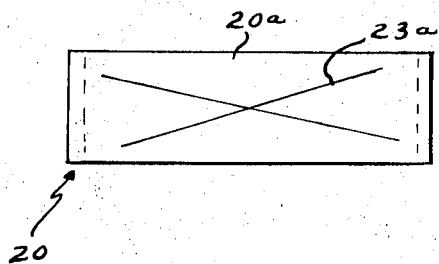
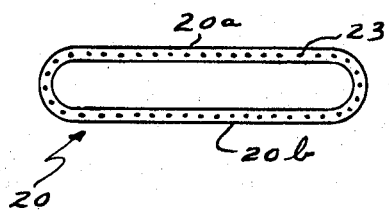

FILAMENT-WOUND, TOROIDAL TIRE WITH PNEUMATIC RIM-LOCKING TUBE

BACKGROUND OF THE INVENTION

This invention relates generally to inflatable pneumatic tires and, in particular, to a toroidal tire having built-in and automatic gripping means for attaching the tire to a wheel.

In conventional tires, the tire casing is usually attached to the rim of a wheel on which it has been assembled by means of beads or bead rings in the form of wire bead hoops. The latter are generally incorporated in or adjacent the open, inner end portions of the conventional tire casing by wrapping the plies thereof in several layers around the said hoops. Although this method has proven to be relatively satisfactory in providing for the attachment of the tire casing to the wheel; nevertheless, failures have occurred as a result of the build-up of considerable heat in the relatively large mass at what is known as the ply turn-ups which have been formed by the aforementioned wrappings of several layers of the tire casing-plies around the wire bead hoops. In addition to the above-noted disadvantage of the heat failure in the ply turn-up area, the use of such beads or bead rings further results in the formation of relatively high wheel flange loadings that ultimately lead to failures in the wheel.

On the other hand, with the use of the closed membrane, toroidal tire of the present invention, no bead is used or needed and, therefore, the previously-referred to wheel flange failures have been eliminated, since the tire loadings are absorbed within the closed membrane structure per se. Of course, the previously-noted heat failure in the ply turn-ups of the conventional tire has also been eliminated in the toroidal tire. However, naturally some means must be provided for positively attaching the torodial tire to the wheel with sufficient gripping strenght to successfully resist relative movement between the tire casing and the wheel during both braking and cornering operations. Heretofore, some type of bonded, rim-locking means was proposed for this purpose. An example of the latter consisted of a rigid ⅜ of an inch to ½ inch thick, fiber glass-epoxy composite strip in the form of a hoop that was positioned and held within an appropriate groove incorporated within the inside surface of, and thereby forcing or expanding a selected tire carcass-test specimen outwardly for locking engagement against a wheel flange, when an inflation pressure was applied thereto. However, this arrangement proved unsatisfactory, during tests thereof, because of the incompatibility of the extreme rigidity of the fiber glass-epoxy material with the relatively resilient, tire casing-material during the application of a load or deformation thereto. This incompatibility resulted in a bond failure and thus an unacceptable separation of the rigid, rim-locking hoop from the tire casing.

The new and novel rim-locking device of the present invention was developed as a result of the further investigation of, and constitutes a unique means of providing a simple and yet positive grip between the main carcass of a toroidal tire and the wheel on which it is mounted, by a unique technique that is improved in a manner to appear self-evident hereinafter in the following summary and detailed description.

SUMMARY OF THE INVENTION

The present invention consists briefly in a closed membrane, toroidal tire mountable on the rim of a wheel and having a main, tire casing that incorporates a casing liner on the inside surface thereof, and a pneumatic rim-locking tube interposed between the casing liner and the inner circumference of the casing. Separate inflation valves are respectively utilized, first, to initially inflate the tire casing, after its mounting on the wheel rim, and, secondly, to thereafter inflate the rim-locking tube. The latter element is fabricated by well-known means with reinforcing cords that may be quite easily placed in criss-crossed position and varied between relatively small and relatively large cord angles respectively located on, or just within the upper and lower surfaces thereof. With this specific orientation, expansion of the outside diameter surface of the rim-locking tube is restricted, whereas contraction of the inside diameter surface thereof is promoted.

Inherent objects and advantages of this invention will become readily apparent hereinbelow from the following disclosure thereof, taken in specific connection with the ccompanying drawings, in which:

BRIEF DESCRIPTION OF THE DRAWINGS

FIG. 1 is an overall assembly view, partly schematic and in cross-section, illustrating a toroidal tire casing incorporating the new and improved rim-locking tube of the present invention and shown on the rim of a wheel;

FIGS. 2 and 3 respectively represent side elevation and plan views, more clearly depicting details of the pneumatic rim-locking tube of the invention; and FIG. 4 is a relatively enlarged, cross-sectional and partly schematic view, taken about on line 4—4 of FIG. 2 and illustrating additional details of the rim-locking tube of FIGS. 1, 2 and 3.

DESCRIPTION OF THE PREFERRED EMBODIMENT

Referring generally to the drawings and, in particular, to FIG. 1 thereof, an inflatable pneumatic tire is illustrated generally at 10 as being mounted on the rim 12 of a special wheel, indicated generally at 11. The tire 10 incorporates a closed membrane, toroidal tire casing, indicated generally at 13, and which includes a pair of side walls, at 14 and 15, the latter shown incorporating a sidewall inflation valve 16, a tire tread 17 with tread reinforcing belts indicated generally and schematically at the reference numeral 18, and closed, inner end portion or circumference at 19 which, unlike conventional tires, provides the previously-noted closed membrane, toroidal tire. In this regard it is noted that the method and machinery for fabricating the present inflatable pneumatic tire casing from a cord-reinforced rubber composite and thereafter molding the same in the shape of a closed toroidal membrane shell of revolution are not shown, since such a tire casing per se is not the subject of the present invention. The only essential requirement is, of course, that the closed membrane be made sufficiently strong to sustain the internal, inflation air pressure to be applied thereinto. Uniquely positioned within the closed toroidal tire casing 13 is the new and novel inflatable, pneumatic rim-locking tube 20 constituting the key feature and improvement of the present invention. The said rim-locking tube 20 is maintained in contacting relation with the inside surface of the inner circumference 19 of the toroidal tire casing 13 by means of an inner tire casing-liner 21 formed on the inside of said casing 13. The tube 20 may or may not be bonded to the tire casing during the curing of the tire.

The above-described pneumatic rim-locking tube 20 may preferably consist, in cross-section as is also seen in FIG. 4, of a relatively flat body that may be reinforced and consist of rubber. Of course, since the tube 20 naturally completely encircles the rim of the wheel 11 (FIG. 1), its appearance in side elevation is that clearly depicted in FIG. 2. As noted hereinbefore, the rim-locking tube 20 is reinforced and, since its function is to expressly urge the inner circumference 19 of the tire casing 13 inwardly to a position of positive locking or gripping engagement with the aforesaid rim of the wheel 11, the reinforcement of the gripping engagement with the tube 20 is preferably made by means of a plurality of reinforcing cords, indicated generally at 23 in FIG. 4. These cords 23 may be incorporated, for example, in a criss-cross pattern in a first layer formed on, or adjacent to the outer diameter 20a of the tube 20, at relatively small cord angles to each other, as is indicated, for example, generally and schematically at 23a in FIG. 3, to thereby create a relatively rigid and non-expandable surface and thus restrict any expansion thereof, and in a second layer formed on, or adjacent to the inner diameter 20b thereof at relatively large cord angles to each other to thus create a relatively resilient surface that enhances or promotes the inward contraction thereof.

In operation, the pneumatic tire 10 may be assembled on the wheel 11, which wheel 11 has been specially modified from that of conventional tire and wheel assemblies to eliminate the usual wheel flange configuration for receiving thereagainst the beaded areas thereof. Inflation of the tire 10 may then be accomplished through use of the sidewall inflation valve 16 (FIG. 1). Next, the internal, rim-locking tube 20, which may be previously inserted on the inside diameter of the mandrel prior to its use to filament-wind the tire casing, as at 13, is inflated through the separate inflation valve 22. The latter inflation action causes the inner diameter 20b of the tube 20 to contract inwardly and thus force the lower portion or inner circumference 19 of the tire casing 13 into a substantial gripping relation with the wheel 11. Of course, as previously described, the simple use of reinforcing cords, as at 23, in a crossing pattern with respect to each other and disposed at cord angles varying between relatively small angles at the outer diameter 20a (Note FIG. 3, for example) and relatively large angles at the inner diameter 20b promotes the above-noted contraction of the pneumatic rim-locking device 20, on application of an inflation pressure thereinto.

Thus, a unique, and yet a simplified and automatic gripping means has been developed by the present invention for incorporation within the main carcass of a closed membrane, toroidal tire by which a positive coupling has been provided between the tire casing and the wheel on which it is mounted.

I claim:

1. An inflatable pneumatic tire mountable on the rim of an aircraft or other vehicular wheel and comprising; a main, completely air-tight, closed membrane-tire casing composed of a resilient composite material and cord-reinforced to thereby sustain the application of an internal air pressure thereinto, without further external support, and further having an outer diameter portion, a tire tread portion formed on said outer diameter portion, a pair of sidewall portions integrally formed to said outer diameter portion and an inner diameter portion integrally formed to, and completely enclosing said sidewall portions in air-tight relation thereto, and disposed relative to, and seated within, and in contact with the wheel rim, a first, inflation valve incorporated rim; one of said sidewall portions in communcation with the interior, and thereby ensuring the inflation of, said main tire casing; auxiliary inflatable, rim-locking means positioned within said main tire casing; inherently built-in, reinforcing-and-tire casing mounted means disposed to trap and thereby prevent the outward expansion of the outer side of said auxiliary, rim-locking means and, simultaneously therewith, both maintain the inner side thereof in continual contact with the inside surface of the inner diameter portion of said main tire casing, and confine its expansion to a relative contraction in the inward direction only; and a second, inflation valve communicating with the interior of, and operable, after the initial assembly of the main tire casing on the wheel rim and the application of an inflation pressureinto the interior of said auxiliary, rim-locking means, to automatically provide for the said inward expansion or contraction of the inner side of said rim-locking means and thus positively urge the inner diameter portion of said main tire casing into a positive gripping engagement with the wheel rim.

2. An inflatable pneumatic tire as in claim 1, wherein said inherently built-in, reinforcing-and-tire casing-mounted means comprises an inner tire casing-liner element formed on, and enclosed by the inside surface of said tire casing for thereby providing for the positive support of the said auxiliary inflatable means.

3. An inflatable pneumatic tire as in claim 1, wherein said auxiliary inflatable, rim-locking neams comprises a completely closed tube member.

4. An inflatable pneumatic tire as in claim 1, wherein said auxiliary inflatable, rim-locking means comprises a relatively flat tube member.

5. An inflatable pneumatic tire as in claim 1, wherein said auxiliary inflatable, rim-locking means comprises a relatively flat, pneumatic rubber tube member incorporating cord-reinforcing means.

6. An inflatable pneumatic tire as in claim 5, said pneumatic rubber tube member comprising an outer diameter-tube portion in contact with said tire casing liner; and an inner diameter-tube portion in contact with the inside surface of the inner diameter portion of said main tire casing.

7. An inflatable pneumatic tire as in claim 6, wherein said cord-reinforcing means comprises a plurality of reinforcing cords oriented in a criss-cross pattern respectively disposed at relatively small cord angles on, and thereby providing a relatively rigid, non-expanding outer diameter-tube portion, and at relatively large cord angles on, and thus facilitating the inward contracting of, the inner diameter-tube portion to ensure the said positive gripping engagement of the inner diameter portion of said tire casing in contact therewith, with the wheel rim.

* * * * *